United States Patent
Chung et al.

(10) Patent No.: US 9,145,490 B2
(45) Date of Patent: Sep. 29, 2015

(54) FLAME-RETARDANT POLYCARBONATE COMPOSITIONS

(71) Applicant: Bayer MaterialScience LLC, Pittsburgh, PA (US)

(72) Inventors: James Y. J. Chung, Wexford, PA (US); James P. Mason, Carnegie, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 562 days.

(21) Appl. No.: 13/780,084

(22) Filed: Feb. 28, 2013

(65) Prior Publication Data

US 2015/0247024 A1    Sep. 3, 2015

(51) Int. Cl.
  *C08K 5/42* (2006.01)
  *C08K 5/5419* (2006.01)

(52) U.S. Cl.
  CPC ............... *C08K 5/5419* (2013.01); *C08K 5/42* (2013.01)

(58) Field of Classification Search
  None
  See application file for complete search history.

(56) References Cited

U.S. PATENT DOCUMENTS

| | | | | |
|---|---|---|---|---|
| 2,444,555 A * | 7/1948 | Daudt | ........................ | 252/78.3 |
| 3,775,367 A * | 11/1973 | Nouverine | .................... | 524/165 |
| 4,197,384 A | 4/1980 | Bialous et al. | | |
| 4,663,374 A * | 5/1987 | Sonoda | ........................ | 524/118 |
| 4,954,549 A * | 9/1990 | Lewis et al. | .................... | 524/264 |
| 5,449,710 A * | 9/1995 | Umeda et al. | ................. | 524/165 |
| 5,693,697 A | 12/1997 | Weider et al. | | |
| 6,184,312 B1 * | 2/2001 | Yamamoto et al. | ............ | 525/474 |
| 6,727,302 B2 | 4/2004 | Goossens et al. | | |
| 6,727,303 B2 | 4/2004 | Ono et al. | | |
| 6,753,367 B2 | 6/2004 | Goossens et al. | | |
| 2009/0061220 A1 | 3/2009 | Nodera et al. | | |
| 2010/0151221 A1 | 6/2010 | Horisawa et al. | | |

FOREIGN PATENT DOCUMENTS

| | | |
|---|---|---|
| JP | 2003049060 | 2/2003 |
| WO | 2012/107514 A1 | 8/2012 |

* cited by examiner

*Primary Examiner* — Robert S Loewe
(74) *Attorney, Agent, or Firm* — John E. Mrozinski, Jr.

(57) ABSTRACT

The present invention relates to flame-retardant polycarbonate compositions and methods for increasing the flame-retardancy of polycarbonate compositions. An α,ω-alkoxy phenyl phenyloligosiloxane compound and an alkali metal sulfonate salt are added to the polycarbonate compositions. The addition of the α,ω-alkoxy phenyl phenyloligosiloxane compound and the alkali metal sulfonate salt produces a polycarbonate composition having a flame-retardance rating of UL 94V-0 at 2 mm thickness or less.

21 Claims, No Drawings

FLAME-RETARDANT POLYCARBONATE COMPOSITIONS

FIELD OF THE INVENTION

This present invention relates in general to polycarbonate compositions, more specifically, the invention relates to polycarbonate compositions having improved flame-retardance.

BACKGROUND OF THE INVENTION

Polycarbonate polymers are thermoplastic resins that are useful in a number of plastic material applications including, for example, injection molding, extrusion, rotation molding, blow molding, thermoforming, and the like. Polycarbonate thermoplastic resins exhibit a number of advantageous material properties and mechanical properties including, for example, high impact strength, excellent dimensional stability, glass-like transparency, excellent thermal resistance, and low-temperature toughness. These properties, among others, make polycarbonate thermoplastic resins attractive as engineering materials for a wide variety of applications including, for example, automotive and transportation, building and construction, electrical and electronics, telecommunication, packaging, medical, optical/opthalmic, and optical media. In various applications, flame-retardancy is an important property, for example, in electrical and electronics applications, such as appliance and equipment housings and parts.

Weider, et al., in U.S. Pat. No. 5,693,697 describe the inclusion of 0.5% of diphenyl dimethoxysilane as a flame retardant additive in combination with 0.1% of potassium perfluorobutane sulfonate to provide a composition exhibiting a flame retardance UL94-V0 at 2.6 mm. However, the boiling point of the additive is 304° C. at 760 mm Hg, which is too low for typical extrusion compounding and injection molding of polycarbonate (at 300-370° C.).

U.S. Pat. No. 6,727,302, issued to Goossens, et al., discloses poly(methylphenyl-siloxane) as an efficient flame retardant additive in combination with potassium perfluorobutane sulfonate or KSS (potassium diphenylsulfon-3-sulfonate) for polycarbonate.

Ono, et al., in U.S. Pat. No. 6,727,303 provide a flame retardant aromatic polycarbonate resin composition comprising (1) 100 parts by weight of resin components comprising 50 to 100 wt % of an aromatic polycarbonate resin (component A-1), 0 to 50 wt % of a styrene-based resin (component A-2) and 0 to 50 wt % of an aromatic polyester resin (component A-3); and (2) 0.1 to 10 parts by weight of a silicone compound (component B) which contains an Si—H group and an aromatic group in the molecule based on 100 parts by weight of the total of the resin components, wherein the silicone compound is at least one selected from silicone compounds which have (1) an Si—H group content (Si—H content) of 0.1 to 1.2 mols/100 g and (2) a content of an aromatic group represented by the following general formula (1) (aromatic group content) of 10 to 70 wt %:

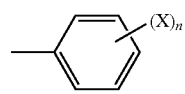

(1)

wherein X's are each independently an OH group or the residual monovalent organic group having 1 to 20 carbon atoms, and n is 0 or an integer of 1 to 5, with the proviso that when n is 2 or more, X's can differ from one another, and molded articles thereof. A halogen-free polycarbonate resin composition having excellent transparency and dripping preventing properties and molded articles thereof is also provided.

WO 2012/107514, in the name of Meyer et al., provides a flame-retardant thermoplastic molding composition. The composition contains aromatic polycarbonate resin, about 0.01 to 0.15 wt.-% of a salt, wherein the salt is an alkali metal or alkaline earth metal salt of perfluoroalkane sulfonic acid, aromatic sulfimide, aromatic sulfonic acid, and about 0.5 to 10 wt.-% of poly- and/or oligo-aryloxysiloxane as flame-retardant synergist. The composition is characterized in that its flammability rating is better than that of aromatic polycarbonate resin containing only inorganic salt of a derivative from aliphatic or aromatic sulfonic acid, sulphonamide or sulfonimide in accordance with UL-94 V standard, while mechanical and optical properties of the compositions are maintained.

There continues to exist a need in the art for ecologically friendly, transparent polycarbonate compositions which are flame retardant.

SUMMARY OF THE INVENTION

Accordingly, the present disclosure provides such ecologically friendly, transparent polycarbonate compositions which are flame retardant, exhibiting UL94-V0 at 2 mm. In a non-limiting embodiment, the inventive composition comprises a polycarbonate. The composition also comprises 0.2% to 1.4% of an α,ω-alkoxy phenyl phenyloligosiloxane of the formula (2):

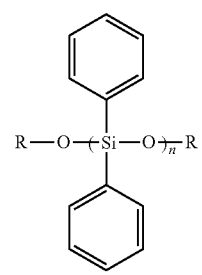

(2)

where n=2 to 4, and 0.15 to 0.20% of a perfluoroalkane sulfonate alkali metal salt, based on total weight of the polycarbonate, the α,ω-alkoxy phenyl phenyloligosiloxane compound, and the perfluoroalkane sulfonate alkali metal salt. The composition has a flame-retardance rating of UL 94V-0 at 2 mm thickness or less, and the composition may be substantially free of polytetrafluoroethylene-based anti-dripping agents.

In another non-limiting embodiment, the present invention provides a method for increasing the flame retardancy of a polycarbonate composition involving adding 0.2% to 1.4% of an α,ω-alkoxy phenyl phenyloligosiloxane of the formula (2)

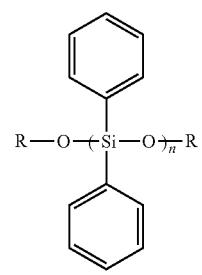

(2)

where n=2 to 4, and 0.15% to 0.20% of a perfluoroalkane sulfonate alkali metal salt to the polycarbonate composition, based on total weight of the polycarbonate, the α,ω-alkoxy phenyl phenyloligosiloxane compound, and the perfluoroalkane sulfonate alkali metal salt. The addition of the siloxane compound and the alkali metal perfluoroalkane sulfonate salt to the polycarbonate composition produces a polycarbonate composition having a flame-retardance rating of UL 94V-0 at 2 mm thickness or less. The polycarbonate composition may be substantially free of polytetrafluoroethylene-based anti-dripping agents.

In another non-limiting embodiment, the inventive composition contains a polycarbonate and 0.1% to 2.0% 1,3-dimethyltetraphenyldisiloxane and 0.1% to 1.0% perfluorobutanesulfonate alkali metal salt, based on the total weight of the polycarbonate, the 1,3-dimethyltetraphenyldisiloxane, and the perfluorobutanesulfonate alkali metal salt. The composition has a flame-retardance rating of UL 94V-0 at 2 mm thickness or less.

In another non-limiting embodiment, the invention provides a method for increasing the flame retardancy of a polycarbonate composition which involves adding to the polycarbonate composition 0.1% to 2.0% 1,3-dimethyltetraphenyldisiloxane and 0.1% to 1.0% perfluorobutanesulfonate alkali metal salt, based on the total weight of the polycarbonate, the 1,3-dimethyltetraphenyldisiloxane, and the perfluorobutanesulfonate alkali metal salt. The addition of the 1,3-dimethyltetraphenyldisiloxane and the perfluorobutanesulfonate alkali metal salt to the polycarbonate composition produces a polycarbonate composition having a flame-retardance rating of UL 94V-0 at 2 mm thickness or less.

It is understood that the invention disclosed and described in this specification is not limited to the embodiments summarized in this Summary.

DETAILED DESCRIPTION OF THE INVENTION

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification.

Reference throughout this specification to "various non-limiting embodiments," or the like, means that a particular feature or characteristic may be included in an embodiment. Thus, use of the phrase "in various non-limiting embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques. Also, any numerical range recited in this specification is intended to include all sub-ranges of the same numerical precision subsumed within the recited range.

The various embodiments disclosed and described in this specification are directed, in part, to compositions containing a polycarbonate, and to methods of increasing the flame retardancy of polycarbonate compositions. The present inventors have surprisingly discovered that α,ω-alkoxy phenyl phenyloligosiloxanes of the formula (2)

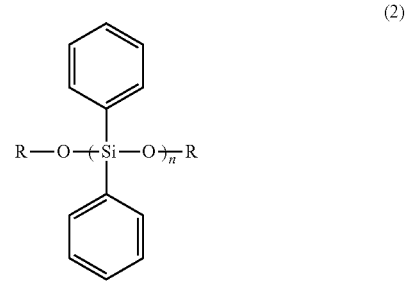

(2)

where n=2-4 are effective flame retardant additives resulting in UL94-V0 at 2 mm, whereas 1,5-dimethoxy decaphenylpentasiloxane (n=5) is not effective as an flame retardant additive (UL94-V2 even at 2.5 mm).

In various non-limiting embodiments, the polycarbonates may be homopolycarbonates, copolycarbonates, branched polycarbonates, and mixtures of any thereof. The polycarbonates may have a weight average molecular weight of 10,000 to 200,000, and in various non-limiting embodiments, 20,000 to 80,000. The polycarbonates may have a melt flow rate (determined according to ASTM D1238-04: *Standard Test Method for Melt Flow Rates of Thermoplastics by Extrusion Plastometer*, which is incorporated by reference herein) at 300° C. of about 1 to about 85 g/10 min, and in various non-limiting embodiments, of about 2 to 30 g/10 min.

In various non-limiting embodiments, the polycarbonates may be prepared, for example, by the known diphasic interface process from a carbonic acid derivative such as phosgene and a dihydroxy compound by polycondensation (see, e.g., German Offenlegungsschriften Numbers 2,063,050; 2,063,052; 1,570,703; 2,211,956; 2,211,957; and 2,248,817; French Patent Number 1,561,518; and the monograph: H. Schnell, "Chemistry and Physics of Polycarbonates," Interscience Publishers, New York, N.Y., 1964, which are all incorporated by reference herein).

In various non-limiting embodiments, the polycarbonates may be prepared from dihydroxy compounds that conform to the structural formulae (3) or (4):

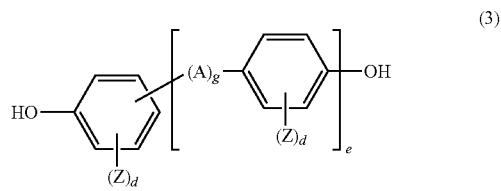

(3)

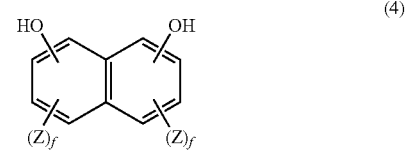

(4)

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, SO—, —SO₂—, or a radical conforming to formula (5):

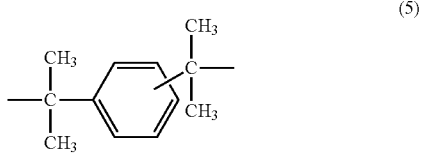

(5)

wherein e and g both denote the number 0 to 1; Z denotes F, Cl, Br or $C_1$-$C_4$-alkyl, and if several Z radicals are substituents in one aryl radical, they may be identical or different from one another; d denotes an integer of from 0 to 4; and f denotes an integer of from 0 to 3.

In various non-limiting embodiments, dihydroxy compounds useful to produce polycarbonates include, hydroquinone; resorcinol; bis-(hydroxyphenyl)-alkanes; bis-(hydroxyphenyl)-ethers; bis-(hydroxyphenyl)-ketones; bis-(hydroxyphenyl)-sulfoxides; bis-(hydroxyphenyl)-sulfides; bis-(hydroxyphenyl)-sulfones; 2,2,4-trimethylcyclohexyl-1,1-diphenol; and α,α'-bis-(hydroxyphenyl)-diisopropylbenzenes; as well as their nuclear-alkylated compounds. Additional aromatic dihydroxy compounds that may be used to produce polycarbonates are described, for example, in U.S. Pat. Nos. 3,028,356; 2,999,835; 3,148,172; 2,991,273; 3,271,367; and 2,999,846, which are all incorporated by reference herein.

In various non-limiting embodiments, polycarbonates may be prepared from bisphenol compounds. For example, polycarbonates may be prepared from bisphenol compounds including, but not limited to, 2,2-bis-(4-hydroxyphenyl)-propane (bisphenol A); 2,4-bis-(4-hydroxyphenyl)-2-methylbutane; 1,1-bis-(4-hydroxyphenyl)-cyclohexane; α,α'-bis-(4-hydroxyphenyl)-p-diisopropylbenzene; 2,2-bis-(3-methyl-4-hydroxyphenyl)-propane; 2,2-bis-(3-chloro-4-hydroxyphenyl)-propane; bis-(3,5-dimethyl-4-hydroxyphenyl)-methane; 2,2-bis-(3,5-dimethyl-4-hydroxyphenyl)-propane; bis-(3,5-dimethyl-4-hydroxyphenyl)-sulfide; bis-(3,5-dimethyl-4-hydroxyphenyl)-sulfoxide; bis-(3,5-dimethyl-4-hydroxyphenyl)-sulfone; dihydroxybenzophenone; 2,4-bis-(3,5-dimethyl-4-hydroxyphenyl)-cyclohexane; α,α'-bis-(3,5-dimethyl-4-hydroxyphenyl)-p-diisopropylbenzene; 2,2,4-trimethyl cyclohexyl-1,1-diphenol; and 4,4'-sulfonyl diphenol.

In various non-limiting embodiments, polycarbonates are prepared from at least one of 2,2,-bis-(4-hydroxyphenyl)-propane; 2,2-bis-(3,5-dimethyl-4-hydroxyphenyl)-propane; 2,2,4-trimethyl cyclohexyl-1,1-diphenol; and 1,1-bis-(4-hydroxyphenyl)-cyclohexane. The polycarbonates may include residue units in their structure derived from one or more of bisphenol compounds.

In addition, in various non-limiting embodiments, polycarbonate resins may be used. The polycarbonate resins may include, for example, phenolphthalein-based polycarbonates, copolycarbonates, and terpolycarbonates, such as are described in U.S. Pat. Nos. 3,036,036 and 4,210,741, which are both incorporated by reference herein.

In various non-limiting embodiments, branched polycarbonates may be used. Branched polycarbonates may be produced, for exampled, by reacting polycondensation a carbonic acid derivative such as phosgene, one or more dihydroxy compounds, and one or more polyhydroxyl compounds. In various non-limiting embodiments, at least one polyhydroxyl compound is reacted with a carbonic acid derivative and at least one dihydroxy compound in relatively small quantities, such as, for example, 0.05 to 2.00 mol % (relative to the dihydroxy compounds present in the reaction mixture). Branched polycarbonates of this type are described, for example, in German Offenlegungsschriften Numbers 1,570,533; 2,116,974; and 2,113,374; British Patent Numbers 885,442 and 1,079,821; and U.S. Pat. No. 3,544,514, which are all incorporated by reference herein.

Non-limiting examples of polyhydroxyl compounds that may be used to prepare branched polycarbonates include, but are not limited to, phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5-methylbenzyl)-4-methyl-phenol; 2,4-dihydroxybenzoic acid; 2-(4-hydroxyphenyl)-2-(2,4-dihydroxy-phenyl)-propane and 1,4-bis-(4,4'-dihydroxy-triphenylmethyl)-benzene. Non-limiting examples of other polyfunctional compounds that may be used to prepare branched polycarbonates include, but are not limited to, 2,4-dihydroxybenzoic acid; trimesic acid; cyanuric chloride; and 3,3-bis-(4-hydroxyphenyl)-2-oxo-2,3-dihydroindole.

In addition to general polycondensation processes, other reaction processes that may be used to prepare polycarbonates include, for example, transesterification, modified polycondensation in a homogeneous phase, and interfacial polycondensation. Non-limiting examples of these and other processes for producing polycarbonates are described in U.S. Pat. Nos. 3,028,365; 2,999,846; 3,153,008; 2,991,273; and 3,912,688, which are incorporated by reference herein.

In various non-limiting embodiments, commercially-available polycarbonate resins may be used. Non-limiting examples of suitable polycarbonate resins include, for example, the bisphenol-based polycarbonate resins available from Bayer MaterialScience, under the MAKROLON name.

Additional polycarbonate resins that may be used in various non-limiting embodiments are described, for example, in U.S. Pat. Nos. 3,030,331; 3,169,121; 3,395,119; 3,729,447; 4,255,556; 4,260,731; 4,369,303; 4,714,746; 5,693,697, which are all incorporated by reference herein.

In various non-limiting embodiments, a method for increasing the flame retardancy of a polycarbonate composition involves adding an α,ω-alkoxy phenyl phenyloligosiloxane and an alkali metal perfluoroalkane sulfonate salt to the polycarbonate composition. The amount of the siloxane compound and the amount of the alkali metal perfluoroalkane sulfonate salt that is incorporated into a polycarbonate resin is an amount that is sufficient, without the inclusion of additional flame retarding agents, to produce a polycarbonate composition exhibiting a flame-retardance rating of UL 94V-0 at 2 mm thickness or less.

For example, the α,ω-alkoxy phenyl phenyloligosiloxane compound may be added to the polycarbonate composition so that the α,ω-alkoxy phenyl phenyloligosiloxane compound makes up 0.1%-2.0% of the total weight of the composition (i.e., including the weight of the α,ω-alkoxy phenyl phenyloligosiloxane compound and the alkali metal perfluoroalkane sulfonate salt, but not including the weight of any other additives present in the composition). The alkali metal perfluoroalkane sulfonate salt may be added to the polycarbonate composition so that the alkali metal perfluoroalkane sulfonate salt makes up 0.1%-1.0% of the total weight of the composition (i.e., including the weight of the α,ω-alkoxy phenyl phenyloligosiloxane compound and the alkali metal perfluoroalkane sulfonate salt, but not including the weight of any other additives present in the composition).

In various non-limiting embodiments, the α,ω-alkoxy phenyl phenyloligosiloxane compound may be 0.1%-2.0% of the total weight of the polycarbonate composition, or any sub-range subsumed therein. In various non-limiting embodiments, the alkali metal perfluoroalkane sulfonate salt may be 0.1%-1.0% of the total weight of the polycarbonate composition, or any sub-range subsumed therein.

The α,ω-alkoxy phenyl phenyloligosiloxane compound useful in the present invention is a compound conforming to the structural formula (2):

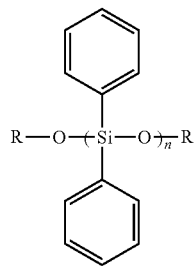

(2)

wherein R is CH$_3$O— and n=2-4.

The alkali metal perfluoroalkane sulfonate salt is a compound conforming to the structural formula (6):

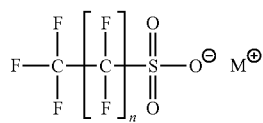

(6)

wherein n is an integer of 0 to 10, and M is an alkali metal. For example, in various non-limiting embodiments, the alkali metal perfluoroalkane sulfonate salt comprises potassium perfluorobutanesulfonate, in which n=4 and M is potassium.

In various non-limiting embodiments, the addition of the α,ω-alkoxy phenyl phenyloligosiloxane compound and the alkali metal perfluoroalkane sulfonate salt to a polycarbonate resin may involve solution blending, bulk blending, melt compounding, and/or melt extruding. For example, separate or combined suspensions and/or solutions of the α,ω-alkoxy phenyl phenyloligosiloxane compound and the alkali metal perfluoroalkane sulfonate salt may be mixed with a polycarbonate resin solution. The α,ω-alkoxy phenyl phenyloligosiloxane and the alkali metal perfluoroalkane sulfonate salt suspension/solutions, if separate, may be mixed simultaneously or successively with the polycarbonate resin solution, dissolving and/or suspending the components in the polycarbonate solvent. The solvents of the mixed solution/suspension may be evaporated to produce a solid mixture of the polycarbonate resin, the α,ω-alkoxy phenyl phenyloligosiloxane, and the alkali metal perfluoroalkane sulfonate salt.

In various non-limiting embodiments, polycarbonate resin, an α,ω-alkoxy phenyl phenyloligosiloxane compound, and an alkali metal perfluoroalkane sulfonate salt may be mixed, either simultaneously or successively, either in bulk or in solution, and then the mixture melt compounded and/or melt extruded. For example, a solid mixture of the polycarbonate resin, the α,ω-alkoxy phenyl phenyloligosiloxane, and the alkali metal perfluoroalkane sulfonate salt may be melt compounded and/or melt extruded at a temperature in the range of 250° C. to 360° C., or any sub-range subsumed therein.

In various non-limiting embodiments, a solid mixture of polycarbonate resin, an α,ω-alkoxy phenyl phenyloligosiloxane compound, and an alkali metal perfluoroalkane sulfonate salt may be granulated to form pellets and/or powder. The solid mixture of polycarbonate resin, an α,ω-alkoxy phenyl phenyloligosiloxane compound, and an alkali metal perfluoroalkane sultanate salt may be granulated after evaporation of any solvents and/or after melt compounding and/or melt extruding the mixture. The resulting thermoplastic polycarbonate resin compositions may be formed into various articles by a variety of techniques including, for example, injection molding, extrusion, rotation molding, blow molding, thermoforming, and the like.

The addition of an α,ω-alkoxy phenyl phenyloligosiloxane compound and an alkali metal perfluoroalkane sulfonate salt to polycarbonate resin compositions increases the flame-retardance of the polycarbonate resin. In various non-limiting embodiments, polycarbonate compositions containing an α,ω-alkoxy phenyl phenyloligosiloxane compound and an alkali metal perfluoroalkane sulfonate salt exhibit a flame-retardance rating of UL 94V-0 at 2 mm thickness or less. The UL 94 flame-retardance ratings are determined in accordance with UL 94: *Standard for Tests for Flammability of Plastic Materials for Parts in Devices and Appliances*, Fifth Edition, Oct. 29, 1996, revised Jun. 2, 2006, which is incorporated by reference herein.

The UL 94 standard provides standardized and accepted (approved Jul. 28, 2010 by the American National Standards Institute (ANSI)) test methods and rating scales to assess and compare the flame-retardancy properties of plastic materials. The UL 94 standard includes six (6) tests: Horizontal Burning Test (HB); 20 mm Vertical Burning Test (V-0, V-1, V-2); 125 mm Vertical Burning Test (5VA, 5VB); Radiant Panel Flame Spread Test; Thin Material Vertical Burning Test (VTM-0, VTM-1, VTM-2); and Horizontal Burning Foamed Material Test (HBF, HF-1, HF-2). The embodiments described in this specification are characterized by flame-retardance ratings determined using the 20 mm Vertical Burning Test (V-0, V-1, V-2).

The UL 94V flame-retardance ratings determined in accordance with the UL 94 specification are reported with the thickness of the test specimen. Generally, thinner test specimens correlate with decreased flame-retardancy, Therefore, it is more difficult to achieve a UL 94V-0 flame-retardance rating with relatively thinner test specimens. In various non-limiting embodiments, polycarbonate compositions comprising a disiloxane compound and an alkali metal perfluoroalkane sulfonate salt exhibit a flame-retardance rating of UL 94V-0 at 2 mm thickness or less.

In various non-limiting embodiments, polycarbonate compositions containing an α,ω-alkoxy phenyl phenyloligosiloxane compound and an alkali metal perfluoroalkane sulfonate salt exhibit a flame-retardance rating of UL 94V-0 at 2 mm thickness or less, wherein the polycarbonate composition is substantially free of any additional flame-retardant agents. As used herein, the term "substantially free" means that the material being described is present in the composition, if at all, as an incidental impurity. In other words, the material does not have a measurable effect on the properties of the composition. In this manner, polycarbonate compositions comprising a disiloxane compound and an alkali metal perfluoroalkane sulfonate salt may exhibit a flame-retardance rating of UL 94V-0 at 2 mm thickness or less without the need for any additional flame-retardant agents.

In various non-limiting embodiments, polycarbonate compositions containing an α,ω-alkoxy phenyl phenyloligosiloxane compound and an alkali metal perfluoroalkane sulfonate salt exhibit a flame-retardance rating of UL 94V-0 at 2 mm thickness or less, wherein the polycarbonate composition is substantially free of polytetrafluoroethylene-based anti-dripping agents. A criterion for achieving a flame-retardance rating of UL 94V-0 is that the test specimen does not produce any flaming particles or drops that ignite a cotton indicator. Prior to the methods and compositions described in this specification, those skilled in the art believed that a polytetrafluoroethylene-based anti-dripping agent was required to achieve a flame-retardance rating of UL 94V-0 at 2 mm thickness or less. Polytetrafluoroethylene-based anti-dripping agents are described, for example, in U.S. Patent Application Publication No. 2007/0123634 A1, which is incorporated by reference herein. The methods and compositions described in this specification are based on the unexpected and surprising discovery that a combination of an α,ω-alkoxy phenyl phenyloligosiloxane additive and an alkali metal perfluoroalkane sulfonate salt additive in a polycarbonate composition produces a polycarbonate composition exhibiting a flame-retardance rating of UL 94V-0 without using a polytetrafluoroethylene-based anti-dripping agent.

Polycarbonate compositions in accordance with the various embodiments described in this specification may also contain various conventional additives, such as, for example, antioxidants, UV absorbers, light absorbers, peroxide scavengers, metal deactivators, fillers and reinforcing agents, lubricants, plasticizers, optical brighteners, pigments, dyes, colorants, additional flame-retarding agents, anti-static agents, mold-release agents, and blowing agents.

Examples of suitable antioxidants include, but are not limited to, organophosphites (e.g., tris(nonylphenyl)phosphate; (2,4,6-tri-tert-butylphenyl)(2-butyl-2-ethyl-1,3-propanediol)phosphate; bis(2,4-di-t-butylphenyl)pentaerythritol diphosphite; and distearyl pentaerythritol diphosphite); triphenyl phosphine; alkylated monophenols; polyphenols; alkylated reaction products of polyphenols with dienes (e.g., butylated reaction products of para-cresol and dicyclopentadiene); alkylated hydroquinones; hydroxylated thiodiphenyl ethers; alkylidene-bisphenols; benzyl compounds; acylaminophenols; esters of β-(3,5-di-tert-butyl-4-hydroxyphenol)-propionic acid with monohydric or polyhydric alcohols; esters of β-(5-tert-butyl-4-hydroxy-3-methylphenyl)-propionic acid with monohydric or polyhydric alcohols; esters of β-(5-tert-butyl-4-hydroxy-3-methylphenyl) propionic acid with monohydric or polyhydric alcohols; esters of thioalkyl or thioaryl compounds (e.g., distearylthiopropionate, dilaurylthiopropionate, ditridecylthiodipropionate); and amides of β-(3,5-di-tert-butyl-4-hydroxyphenol)-propionic acid.

Examples of suitable UV absorbers and light absorbers include, but are not limited to, 2-(2'-hydroxyphenyl)-benzotriazoles; 2-hydroxy-benzophenones; esters of substituted and unsubstituted benzoic acids; acrylates; and nickel compounds.

Examples of suitable peroxide scavengers include, but are not limited to, ($C_{10}$-$C_{20}$) alkyl esters of betathiodipropionic acid, and mercapto benzimidazole.

Examples of suitable fillers and reinforcing agents include, but are not limited to, silicates, $TiO_2$, glass fibers, carbon black, graphite, calcium carbonate, talc, and mica.

Examples of suitable additional flame retardant additives include, but are not limited to, other alkaline- and alkaline earth-salts, other halogen-containing organic flame retardant compounds, organophosphate flame retardant compounds, and borate flame retardant compounds. The flame retardant salts include, for example, the salts described in U.S. Pat. Nos. 3,535,300; 3,775,367; 3,909,490; and 3,917,559, which are all incorporated by reference herein.

Examples of suitable additional halogen-containing flame retardant compounds include, but are not limited to, bromine-containing organic flame retardant compounds, such as, for example tetrabromooligocarbonate, terabromophthalimide, tribromophenoxymethane, bis(tribromophenoxy)ethane, tris (tribromophenyl)-triphosphate, hexabromocyclodecane, decabromodiphenylether, and brominated epoxy resins, including copolymers of tetrabromobisphenol A and epichlorohydrin.

Examples of suitable organophosphate flame retardant compounds include, but are not limited to, phenyl bisdodecyl phosphate, ethyl diphenyl phosphate, resorcinol diphosphate, diphenyl hydrogen phosphate, tritolyl phosphate, 2-ethylhexyl hydrogen phosphate, and bisphenol-A phosphate.

The non-limiting and non-exhaustive examples that follow are intended to further describe various non-limiting and non-exhaustive embodiments without restricting the scope of the embodiments described in this specification.

EXAMPLES

The amounts of the components present in the polycarbonate compositions are reported in Tables 1 and 2 in wt. %. Polycarbonate compositions were prepared using the following:

PC an aromatic polycarbonate resin made from bisphenol-A, having a melt flow rate of about 1.2 $cm^3$/10 min (300° C./1.2 kg) per ASTM D-1238 (MAKROLON 5308);

SILOXANE A 1,3-dimethoxytetraphenyldisiloxane, commercially available from Silar Laboratories, (SILAR 2206);

SILOXANE B α,ω,-dimethoxy-polydiphenylsiloxane, commercially available from Silar Laboratories, (SILAR 2418):

SULFONATE A potassium diphenyl sulfone sulfonate;

SULFONATE B sodium salt of a sulfopolyester polymer, commercially available from Eastman Chemical Company as AQ 38S;

FLAME RETARDANT potassium perfluorobutanesulfonate, commercially available from Lanxess AG as BAYOWET C4 TP AC 2001.

The inventive compositions were prepared by melting the polycarbonate resin in a twin-screw extruder, adding the α,ω-alkoxy phenyl phenyloligosiloxane and the organic salt directly to the polycarbonate melt, melt blended in the extruder, the blended extrudate dried, and the dried extrudate diced using conventional procedures to form polycarbonate resin pellets.

The melt flow rate (MVR, cm$^3$/10 min) of the polycarbonate resin pellets was determined in accordance with ASTM D1238-04: *Standard Test Method for Melt Flow Rates of Thermoplastics by Extrusion Plastometer*, which is incorporated by reference herein. The polycarbonate resins were injection molded to form UL 94V test specimens having thicknesses of 2.0 mm and 2.5 mm, respectively.

The polycarbonate resin test specimens containing the α,ω-alkoxy phenyl phenyloligosiloxanes and the organic salts were evaluated for UL 94V flame-retardance ratings at 2.0 mm thickness and 2.5 mm thickness in accordance with the UL 94 specification. The results are presented in Tables 1 and 2.

As can be appreciated by reference to Table 1, the polycarbonate compositions containing 0.20%-1.40% 1,3-dimethoxytetraphenyldisiloxane and 0.16% potassium perfluorobutanesulfonate achieved UL 94 flame-retardance ratings of 94V-0 at 2.0 mm under both preconditioning procedures. Therefore, polycarbonate compositions containing 1,3-dimethoxytetraphenyldisiloxane and potassium perfluorobutanesulfonate exhibited an overall UL 94V-0 rating at 2.0 mm and 2.5 mm. However, the polycarbonate compositions containing 1,3-dimethoxytetraphenyldisiloxane and the other two organic salts did not exhibit a UL 94V-0 rating for any of the tested amounts of 1,3-dimethoxytetraphenyldisiloxane, for any tested thickness, or under either of the preconditioning procedures.

As can be appreciated by reference to Table 2, none of the polycarbonate compositions containing the α,ω-dimethoxy-polydiphenylsiloxane achieved a UL 94 flame-retardance rating of 94V-0 at 2.0 mm under both preconditioning procedures. Therefore, none of the polycarbonate compositions containing the α,ω-dimethoxy-polydiphenylsiloxane exhibited an overall UL 94V-0 rating at 2.0 mm or 2.5 mm.

The polycarbonate compositions from Examples 10, 11, and 12 only differ from the polycarbonate compositions from Examples 1, 2, and 3 in the identity of the siloxane component (α,ω-dimethoxy-polydiphenylsiloxane versus 1,3-dimethoxytetraphenyl-disiloxane). These two siloxane components are chemically homologous, with the α,ω-dimethoxy-polydiphenylsiloxane being the siloxane with the higher molecular weight. Therefore, it was very surprising and unexpected that the polycarbonate compositions from Examples 1, 2, and 3 exhibited overall UL 94V-0 ratings, whereas the polycarbonate compositions from Examples 10, 11, and 12 did not exhibit overall UL 94V-0 ratings.

TABLE 1

| Notebook reference | Ex. 1 931573A | Ex. 2 931573B | Ex. 3 931573C | Ex. 4 931573D | Ex. 5 931573E | Ex. 6 931573F | Ex. 7 931573G | Ex. 8 931573H | Ex. 9 931573I |
|---|---|---|---|---|---|---|---|---|---|
| PC | 99.64 | 99.04 | 98.44 | 99.60 | 99.00 | 98.40 | 99.20 | 98.60 | 98.00 |
| SILOXANE A | 0.20 | 0.80 | 1.40 | 0.20 | 0.80 | 1.40 | 0.20 | 0.80 | 1.40 |
| FLAME RETARDANT | 0.16 | 0.16 | 0.16 | 0.00 | 0.00 | 0.00 | 0.00 | 0.00 | 0.00 |
| SULFONATE A | 0.00 | 0.00 | 0.00 | 0.20 | 0.20 | 0.20 | 0.00 | 0.00 | 0.00 |
| SULFONATE B | 0.00 | 0.00 | 0.00 | 0.00 | 0.00 | 0.00 | 0.60 | 0.60 | 0.60 |
| MVR (cm$^3$/10 min) | 11.90 | 14.10 | 15.20 | 11.30 | 12.40 | — | 16.30 | 19.70 | — |
| UL94V rating (2.0 mm) (23° C./2 days) | V-0 | V-0 | V-0 | — | V-2 | — | — | — | — |
| UL94V rating (2.0 mm) (70° C./7 days) | V-0 | V-0 | V-0 | — | V-2 | — | — | — | — |
| UL94V ratings (2.5 mm) (23° C./2 days) | V-0 | V-0 | V-0 | V-2 | V-2 | — | V-2 | V-2 | — |
| UL94V ratings (2.5 mm) (70° C./7days) | V-0 | V-0 | V-0 | V-2 | V-0 | — | V-2 | V-2 | — |

TABLE 2

| Notebook reference | Ex. 10 931571A | Ex. 11 931571B | Ex. 12 931571C | Ex. 13 931571D | Ex. 14 931571E | Ex. 15 931571F | Ex. 16 931571G | Ex. 17 931571H | Ex. 18 931571I |
|---|---|---|---|---|---|---|---|---|---|
| PC | 99.64 | 99.04 | 98.44 | 99.60 | 99.00 | 98.40 | 99.20 | 98.60 | 98.00 |
| SILOXANE B | 0.20 | 0.80 | 1.40 | 0.20 | 0.80 | 1.40 | 0.20 | 0.80 | 1.40 |
| FLAME RETARDANT | 0.16 | 0.16 | 0.16 | 0.00 | 0.00 | 0.00 | 0.00 | 0.00 | 0.00 |
| SULFONATE A | 0.00 | 0.00 | 0.00 | 0.20 | 0.20 | 0.20 | 0.00 | 0.00 | 0.00 |
| SULFONATE B | 0.00 | 0.00 | 0.00 | 0.00 | 0.00 | 0.00 | 0.60 | 0.60 | 0.60 |
| UL94V rating (2.0 mm) (23° C./2 days) | V-0 | V-2 | V-2 | V-2 | V-2 | — | V-2 | V-2 | — |
| UL94V rating (2.0 mm) (70° C./7 days) | V-2 | V-2 | V-2 | V-2 | V-2 | — | V-2 | V-2 | — |
| UL94V rating (2.5 mm) (23° C./2 days) | V-0 | V-0 | V-2 | V-2 | V-2 | — | V-2 | V-2 | — |
| UL94V ratings (2.5 mm) (70° C./7days) | V-2 | V-2 | V-2 | V-2 | V-2 | — | V-2 | V-2 | — |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A method for increasing the flame retardancy of a polycarbonate composition, the method comprising
adding about 0.1 wt. % to about 2.0 wt. % 1,3-dimethyltetraphenyldisiloxane to the polycarbonate composition; and
adding about 0.1 wt. % to about 1.0 wt. % perfluorobutanesulfonate alkali metal salt to the polycarbonate composition;
wherein the wt. %, all instances, are based on the total weight of the polycarbonate, the 1,3-dimethyltetraphenyldisiloxane, and the perfluorobutanesulfonate alkali metal salt; and wherein the composition exhibits a flame-retardance rating of UL 94V-0 at 2 mm thickness or less.

2. The method according to claim 1, wherein the polycarbonate composition is substantially free of polytetrafluoroethylene-based anti-dripping agents.

3. The method according to claim 1, wherein the 1,3-dimethyltetraphenyldisiloxane is added in an amount of about 0.1 wt. % to about 1.5 wt. %.

4. The method according to claim 1, wherein the 1,3-dimethyltetraphenyldisiloxane is added in an amount of about 0.2 wt. % to about 1.4 wt. %.

5. The method according to claim 1, wherein the perfluorobutanesulfonate alkali metal salt is added in an amount of about 0.1 wt. % to about 0.2 wt. %.

6. The method of claim 1, wherein the perfluorobutanesulfonate alkali metal salt is added in an amount of 0.15 wt. % to 0.20 wt. %.

7. The method according to claim 1, wherein the 1,3-dimethyltetraphenyldisiloxane and the perfluorobutanesulfonate alkali metal salt are mixed with the polycarbonate composition, and the mixture is melt compounded.

8. The method according to claim 1, wherein the 1,3-dimethyltetraphenyldisiloxane and the perfluorobutanesulfonate alkali metal salt are mixed with the polycarbonate composition, and the mixture is melt extruded.

9. The method of claim 1, wherein the 1,3-dimethyltetraphenyldisiloxane and the perfluorobutanesulfonate alkali metal salt are mixed with the polycarbonate composition, and the mixture is granulated.

10. A composition comprising:
(A) a polycarbonate;
(B) about 0.1 wt. % to about 2.0 wt. % 1,3-dimethyltetraphenyldisiloxane based on total weight of (A), (B), and (C); and
(C) about 0.1 wt. % to about 1.0 wt. % perfluorobutanesulfonate alkali metal salt wherein the wt. %, all instances, is based on total weight of (A), (B), and (C); and wherein the composition exhibits a flame-retardance rating of UL 94V-0 at 2 mm thickness or less.

11. The composition according to claim 10, wherein the composition is substantially free of polytetrafluoroethylene-based anti-dripping agents.

12. The composition according to claim 10, wherein the composition comprises about 0.1 wt. % to about 1.5 wt. % 1,3-dimethyltetraphenyldisiloxane based on the total weight of the composition.

13. The composition according to claim 10, wherein the composition comprises about 0.2 wt. % to about 1.4 wt. % 1,3-dimethyltetraphenyldisiloxane based on the total weight of (A), (B), and (C).

14. The composition according to claim 10, wherein the composition comprises about 0.1 wt. % to about 0.2 wt. % perfluorobutanesulfonate alkali metal salt based on the total weight of (A), (B), and (C).

15. The composition according to claim 10, wherein the composition comprises about 0.15 wt. % to about 0.20 wt. % perfluorobutanesulfonate alkali metal salt based on the total weight of (A), (B), and (C).

16. A method for increasing the flame retardancy of a polycarbonate composition, the method comprising:
adding about 0.2 wt. % to about 1.4 wt. % of an α,ω-alkoxy diphenyloligosiloxane of the formula (2)

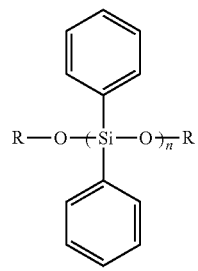

(2)

where n=2-4 to the polycarbonate composition; and
adding about 0.15 wt. % to about 0.20 wt. % of a perfluoroalkane sulfonate alkali metal salt to the polycarbonate composition;
wherein the wt. %, all instances, is based on the total weight of the polycarbonate, the α,ω-alkoxy diphenyloligosiloxane, and the potassium perfluorobutanesulfonate, and wherein the composition exhibits a flame-retardance rating of UL 94V-0 at 2 mm thickness or less.

17. The method according to claim 16, wherein the α,ω-alkoxy phenyl phenyloligosiloxane compound comprises 1,3-dimethyltetraphenyldisiloxane, and wherein the alkali metal perfluoroalkane sulfonate salt comprises potassium perfluorobutanesulfonate.

18. The method according to claim 16, wherein the polycarbonate composition is substantially free of polytetrafluoroethylene-based anti-dripping agents.

19. A composition comprising:
(A) a polycarbonate;
(B) about 0.2 wt. % to about 1.4 wt. % of an α,ω-alkoxy diphenyloligosiloxane of the formula (2)

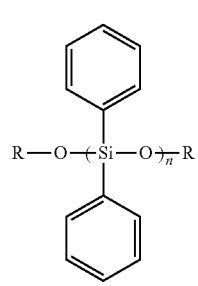

(2)

where n=2-4 based on total weight of the composition; and
(C) about 0.15 wt. % to about 0.20 wt. % of a perfluoroalkane sulfonate alkali metal salt based on total weight of (A), (B), and (C);

wherein the composition exhibits a flame-retardance rating of UL 94V-0 at 2 mm thickness or less.

20. The composition according to claim 19, wherein the α,ω-alkoxy phenyl phenyloligosiloxane compound comprises 1,3-dimethyltetraphenyldisiloxane, and wherein the alkali metal perfluoroalkane sulfonate salt comprises potassium perfluorobutanesulfonate.

21. The composition according to claim 19, wherein the composition is substantially free of polytetrafluoroethylene-based anti-dripping agents.

* * * * *